I. W. JONES.
MINE CAR WHEEL.
APPLICATION FILED SEPT. 18, 1911.
1,051,892.  Patented Feb. 4, 1913.
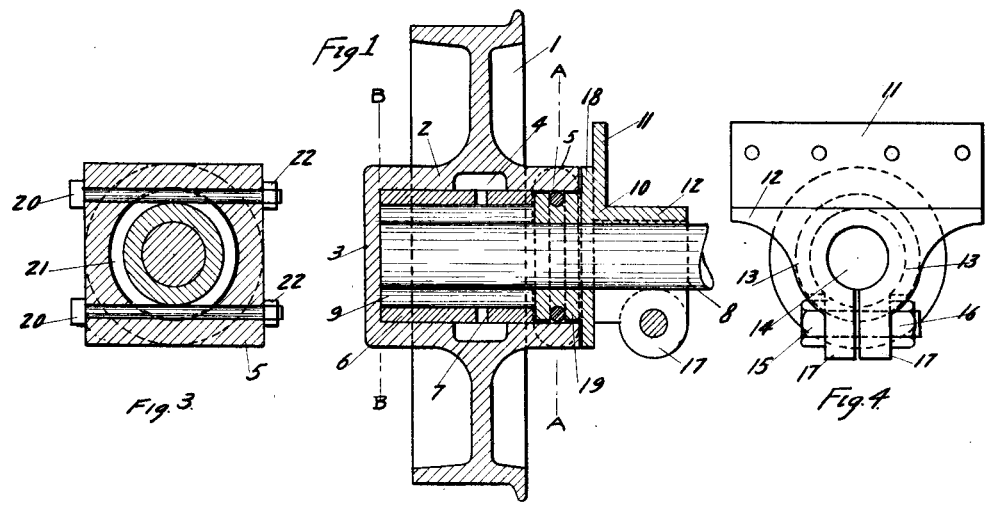
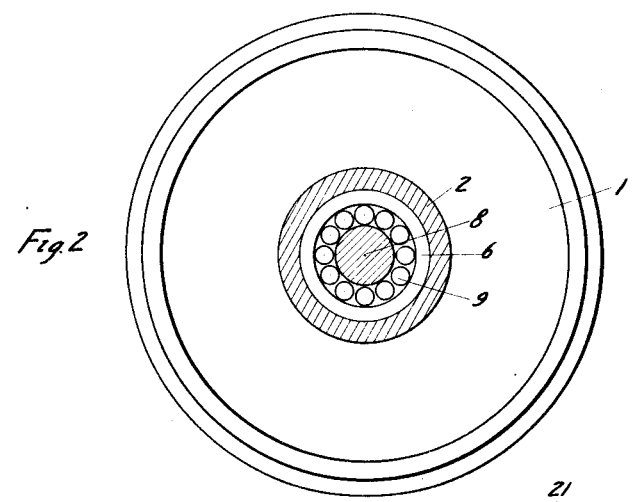
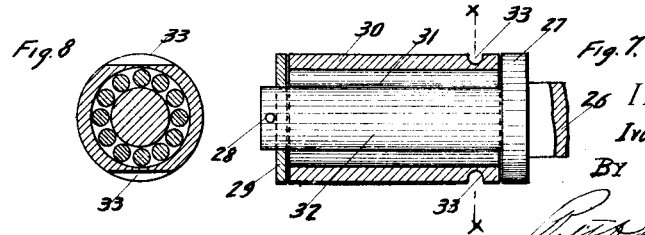
WITNESSES:
INVENTOR
Ivor W. Jones
BY
Attorney

UNITED STATES PATENT OFFICE.

IVOR W. JONES, OF BIRMINGHAM, ALABAMA.

MINE-CAR WHEEL.

1,051,892.  Specification of Letters Patent.  Patented Feb. 4, 1913.

Application filed September 18, 1911. Serial No. 649,831.

*To all whom it may concern:*

Be it known that I, IVOR W. JONES, a citizen of the United States of America, residing at Birmingham, in the county of Jefferson and State of Alabama, have invented certain new and useful Improvements in Mine-Car Wheels, of which the following is a specification.

My invention relates to an improvement in wheels, consisting essentially in a novel means for mounting the wheels on their axles or bearings which is more particularly adapted for use on mine car wheels. Its object is to detachably retain the wheel on its bearing by means which will stand the maximum wear which will be distributed over parts removable, as contrasted with constructions in which the wear from the retaining pins is taken up by the shaft or integral portions of the wheel proper, and in which also the wearing parts are effectively protected and comprise considerable stock to increase their life and hence the length of time the wheel can be used continuously without repairs.

My invention is more particularly, but not exclusively, designed for use in connection with a roller bearing wheel and permits the use of a hub closed at its outer end so as to minimize the tendency of dirt to work into the bearing.

I have illustrated several modifications of the broad idea underlying my invention which consists in passing one or more retaining pins transversely through the wheel hub or parts rigid therewith at the side thereof adjacent to the car and providing within the hub a channeled member to receive the pins, which member is itself held against longitudinal displacement on the shaft. According to one design, this member is fixed on the wheel axle and circumferentially grooved so that the retaining pins work in the groove as the wheel turns, while in the second form the pins engage in a groove provided in a rotatable bushing, which is held against longitudinal movement on the shaft by any suitable means fixed to the axle, and being thus held acts also to hold the wheel against longitudinal displacement. In all constructions the retaining pins are readily removable and have no tendency to become fastened in the wheels.

In its preferred embodiment, my invention comprises the details of construction and arrangement of parts disclosed in the accompanying drawings and more fully hereinafter described and claimed, reference being had to the said drawings, in which:—

Figure 1 represents a vertical sectional view of one embodiment of my invention. Fig. 2 is an end elevation of Fig. 1, with the hub shown in section along the line *b—b* of Fig. 1. Fig. 3 is a vertical sectional view taken along the line *a—a* of Fig. 1. Fig. 4 is an end elevation of the wheel retaining member. Figs. 5 and 6 are side and end views, respectively, of a modification of the construction shown in Fig. 1, in which the groove member is fixed to or formed integrally with a squared shaft. Fig. 7 is a vertical sectional view through a rotary bushing which is notched to receive the retaining pins on the wheel so that the wheel and bushing turn together. Fig. 8 is a vertical cross sectional view through the line *x—x* of Fig. 7.

Similar reference numerals refer to similar parts throughout the drawings.

Referring to Figs. 1 to 4 inclusive, I show a mine car wheel 1 having a dust proof hub 2 closed at its outer end by an integral wall 3 and provided with a central circumferential oil chamber 4. The hub is also provided with an inside extension 5 and is bored out to form a circular chamber which receives a bushing 6 that is fixed therein in any suitable manner and provided with oil passages 7 opposite the oil chamber 4. The wheel is shown mounted upon a round axle 8 being rotatably supported thereon by a series of antifriction rollers 9 interposed between the axle and the bushing 6. The means for retaining the wheel on the shaft comprise a retaining member 10 formed with a square seat 11 which is provided with openings to receive bolts or rivets by which it may be suitably attached to the frame of the car which rests upon the horizontal portion 12 of the member. This portion 12 is provided with depending clamp sections 13 between which I provide an opening 14 to receive the axle 8. The sections are adapted to be clamped about the axle by a nut 15 and a bolt 16 which passes through the apertured lugs or ears 17 at the bottom of the clamp members. The inside extension 5 of the hub is adapted to abut against an off-set shoulder 18 which is turned up on the outer face of the member 10. Integral with the member is a circular extension 19 which makes a close running fit in the open end of the hub and projects thereinto to a point adjacent to the ends of the bushing 6 and rollers 9.

The extension 5 of the hub, as seen in Fig. 3, is provided with openings adapted to receive retaining pins 20, which pass through the hub and engage in an annular groove or channel 21 formed in the extension 19 when in position in the hub. Nuts 22 securely hold these pins in place and as long as they are in place the wheel is free to turn on its roller bearing and is held against longitudinal displacement by the pins engaging the side walls of the groove 21. All wear is naturally taken up by the pins and the walls of the groove, and when either of said parts have been sufficiently worn it may be readily replaced without delay or much cost and thus I provide a mine car wheel which is practically free from any wear except on removable parts, which in the case of the grooves are formed in a member having a relatively large diameter and considerable stock to give long wear to the bearing parts. It will be noted also that it is practically impossible for dirt to work into the bearing as the outer end is closed entirely and dirt tending to work between the flange 18 and the end 5 of the wheel will be caught in the channel 21 and will probably not work past the long bearing surface to the rollers.

In Fig. 5 I show a square shaft 23 rounded at its end 24 and provided with a retaining collar 25 which may be shrunk or fastened thereon in any suitable manner, or if desired made integral therewith. I provide this collar with an annular groove 21, as in the case of the extension 19, which is adapted to receive the retaining pins 20 and hold the wheel with its bearings in place on the shaft in the same manner as shown in Fig. 1.

In Fig. 7 I show the axle 26 provided with the usual form of collar 27 and an end opening to receive a cotter pin 28 which holds in place an end washer 29. A rotatable bushing 30 is mounted on roller bearings 31 on the rounded end portion 32 of the axle and is held in place between the collar 27 and washer 29. This bushing is provided with a pair of oppositely disposed cross notches 33 in which the retaining pins 20 in the wheel hub are adapted to engage so as to lock the wheel hub against longitudinal displacement on the rotatable bushing, the wheel and bushing being held on the shaft by the cotter pin and washer 29.

My wheel may be readily assembled and taken apart, and it is practically without wear except on the pins and walls of the groove or on the washer. By placing the retaining pins in the portion of the hub between the wheel and car, I protect them from injury, keep them always accessible for detaching the wheel, and I remove the point of wear farthest from the outer end of the axle and place it where it can be best protected.

While I prefer to use the groove to receive the pins, it will be evident that the side wall of the groove nearest the wheel and forming a shoulder, is the only part which is effective in connection with the pins for holding the wheel against working off.

Having thus described my invention, what I claim as new and desire to secure by Letters Patent, is:—

1. The combination with an axle, of a wheel retaining member rigid thereon, a wheel having a hub provided with a cylindrical chamber to receive the axle, said retaining member having a cylindrical wheel retaining projection which enters said cylindrical chamber and is provided at its inner end with an annular shoulder, a detachable locking element inserted through the hub and adapted to engage a side wall of said shoulder, and a flanged portion on said retaining member which closes the open end of the chamber in the hub, substantially as described.

2. The combination with a wheel having a hub portion provided with a cylindrical bearing chamber, an axle which projects into said chamber, a bearing interposed between the inner end of said axle and said chamber walls and a retaining member rigidly attached to the axle and adapted to close the inner end of said cylindrical chamber, said retaining member comprising a flanged portion which makes a close running joint with the adjacent end of the hub and having an extension which projects into the hub and at its inner end is provided with an annular shoulder, and one or more retaining pin portions which are inserted through the hub and adapted to engage said shoulder to hold the wheel in running position on the axle, substantially as described.

3. In combination, a round axle, a wheel having a hub bored to provide a cylindrical chamber of substantially uniform diameter which is closed at its outer end, a lubricating chamber in the wheel hub, antifriction bearings interposed between the hub and axle, means to retain the wheel on the axle comprising a clamp member adapted to be gripped on the shaft, said member comprising a portion adapted to be connected to the side of the car, a portion which abuts against the inner end of the hub and by a close running joint therewith closes the open end of the hub chamber, and a wheel retaining cylindrical portion which is circumferentially grooved and makes a close running fit in the open end of the hub chamber, and one or more locking pins which are inserted tangentially through the hub and which are disposed in said groove, substantially as described.

In testimony whereof I affix my signature in presence of two witnesses.

IVOR W. JONES.

Witnesses:
NOMIE WELSH,
R. D. JOHNSTON, Jr.

Copies of this patent may be obtained for five cents each, by addressing the "Commissioner of Patents, Washington, D. C."